United States Patent
Huang et al.

(10) Patent No.: US 11,364,684 B2
(45) Date of Patent: Jun. 21, 2022

(54) PART IDENTIFIER FOR USE AT MANUFACTURING FACILITY

(71) Applicant: Hewlett-Packard Development Company, L.P., Spring, TX (US)

(72) Inventors: Wei Huang, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/612,789

(22) PCT Filed: Feb. 13, 2018

(86) PCT No.: PCT/US2018/017933
§ 371 (c)(1),
(2) Date: Nov. 12, 2019

(87) PCT Pub. No.: WO2019/160531
PCT Pub. Date: Aug. 22, 2019

(65) Prior Publication Data
US 2020/0376767 A1 Dec. 3, 2020

(51) Int. Cl.
| | |
|---|---|
| B05D 1/36 | (2006.01) |
| B29C 64/386 | (2017.01) |
| B33Y 50/00 | (2015.01) |
| B29C 64/35 | (2017.01) |
| B33Y 40/20 | (2020.01) |
| B41M 5/00 | (2006.01) |
| G05B 19/4099 | (2006.01) |
| G06K 1/12 | (2006.01) |
| G06K 19/06 | (2006.01) |
| B22F 10/10 | (2021.01) |

(52) U.S. Cl.
CPC ............ *B29C 64/386* (2017.08); *B29C 64/35* (2017.08); *B33Y 40/20* (2020.01); *B33Y 50/00* (2014.12); *B41M 5/0088* (2013.01); *G05B 19/4099* (2013.01); *G06K 1/121* (2013.01); *G06K 19/06028* (2013.01); *G06K 19/06037* (2013.01); *B22F 10/10* (2021.01); *G05B 2219/49023* (2013.01)

(58) Field of Classification Search
CPC ....... B29C 64/386; B29C 64/35; B33Y 50/00; B33Y 40/20
USPC ........................................................ 427/264
See application file for complete search history.

(56) References Cited

U.S. PATENT DOCUMENTS

| | | | |
|---|---|---|---|
| 9,064,228 B2 | 6/2015 | Worez et al. | |
| 9,076,097 B1 | 7/2015 | Cudak et al. | |
| 2004/0065154 A1* | 4/2004 | Kibblewhite | ........... F16B 31/02 73/761 |
| 2012/0234905 A1 | 9/2012 | Lau | |
| 2014/0046469 A1 | 2/2014 | Bickel et al. | |
| 2014/0301179 A1 | 10/2014 | Rich et al. | |
| 2016/0221114 A1 | 8/2016 | Dietrich | |

(Continued)

FOREIGN PATENT DOCUMENTS

WO    WO-2015077256    5/2015

*Primary Examiner* — Ahshik Kim
(74) *Attorney, Agent, or Firm* — Nwamu PC

(57) ABSTRACT

A method is disclosed in which an identifier is to be printed on a surface of a part to be additive manufactured. The identifier is utilized during post-processing of the part at the manufacturing facility, then the identifier is modified so as to no longer be visible before leaving the facility.

12 Claims, 10 Drawing Sheets

(56) References Cited

U.S. PATENT DOCUMENTS

| | | | |
|---|---|---|---|
| 2016/0247008 A1* | 8/2016 | Lewis | G06K 7/1447 |
| 2016/0307083 A1 | 10/2016 | Kumar et al. | |
| 2017/0232773 A1 | 8/2017 | Kamijo et al. | |
| 2018/0001565 A1* | 1/2018 | Hocker | G01N 23/223 |
| 2019/0026504 A1* | 1/2019 | Wang | G06K 19/06103 |
| 2021/0221052 A1* | 7/2021 | Berger | B29C 64/118 |

* cited by examiner

200

Acme Toy Company toy #1 toy #2 toy #3 toy #4

500

PART IDENTIFIER FOR USE AT MANUFACTURING FACILITY

BACKGROUND

Additive manufacturing enables the mass-production of parts. Identifying the parts produced at the same time, such as during the same build, may be desirable for such large-scale manufacturing. Identifying parts based on their appearances, such as geometry and color, may be challenging, especially when parts are very similar to one another.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the examples described herein, a method is disclosed in which parts produced at a manufacturing facility are labelled with an identifier. The identifier is then visually or digitally read during post-production of the part. Prior to leaving the manufacturing facility, the identifier of the part is covered so as to no longer be visually or digitally discerned. The part experiences no transformation while being labelled with the identifier.

Figure 1:
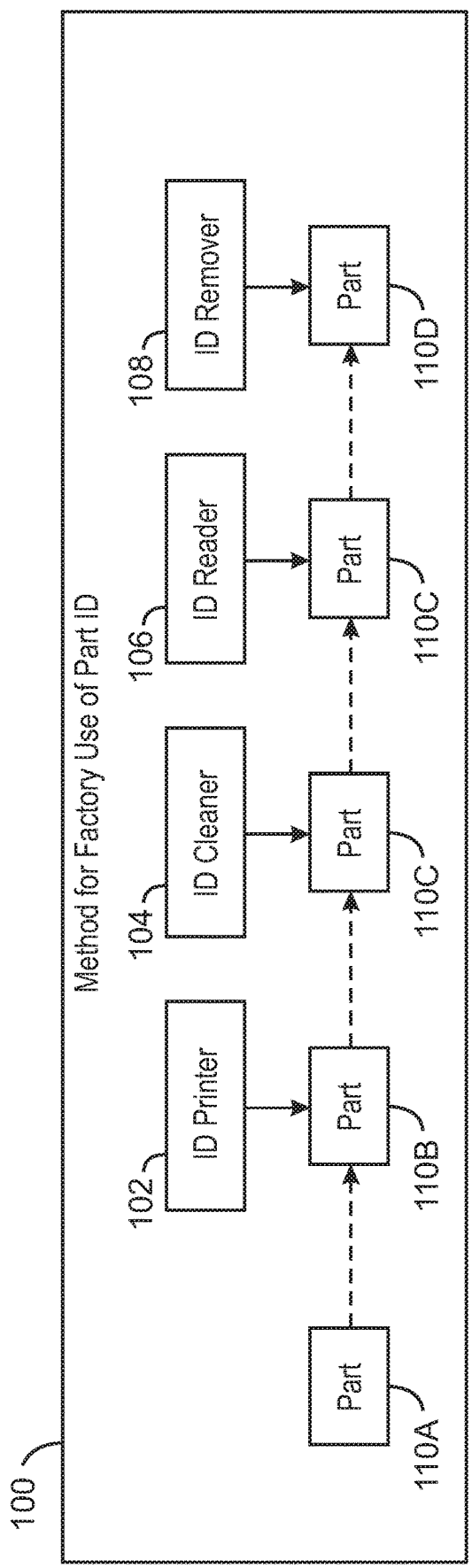
FIG. 1 is a simplified diagram of a method for factory use of a part ID, according to examples.

FIG. 1 is a simplified diagram of a method 100 for factory use of a part ID, according to examples. The method 100 features four operations 102, 104, 106, and 108, in which an identifier (ID) is associated with a part in a manufacturing facility. The part is referenced differently, as part 110A, 110B, 110C, and 110D, at each point in the method (collectively, "part 110").

The part is initially indicated as part 110A. The method 100 utilizes an ID printer 102, to attach an identifier (ID) to the part 110A, denoted part 110B. An optional ID cleaner 104 cleans the part 110B, forming part 110C, in which the ID is visible. Next, an ID reader 106 reads the now viewable ID of the part 110C. The ID reader 106 may be a human viewing the ID or may be a digital ID reader, such as a barcode reader. An ID remover 108 removes the ID on the part 110C, resulting in part 110D. The part 110D, no longer having a viewable or readable ID, is ready to leave the manufacturing facility.

Identifying a part based on its appearance, such as geometry and color, may be challenging, especially when the part is similar to another part. Labeling mass-produced parts is a practical way to facilitate such identification. Labelling a part, such as one formed during additive manufacturing, may be challenging because the label is difficult to apply, such as an embedded radio frequency identifier (RFID), for example. Or, the labelling may affect the cosmetic appearance of the part, such as a label that changes the smoothness of a surface of the part. Or, the labelling may affect the function of the part, such as when RFID labels affect the part mechanically.

The method 100 illustrated in FIG. 1 solves these issues by allowing an identifier to be temporarily affixed to a part built in a manufacturing facility. In one example, the part is formed using additive manufacturing characterized by multi-color capability, and the method 100 exploits this multi-color capacity to add a color-contrasting temporary ID to the part, also using additive manufacturing. In a second example, the part is not formed using additive manufacturing, but the temporary ID is added to the part using additive manufacturing. In a third example, a part is partially made with a non-additive manufactured method, then completed using additive manufacturing. Such a hybrid part may also be a good candidate for the method 100.

Figure 2:
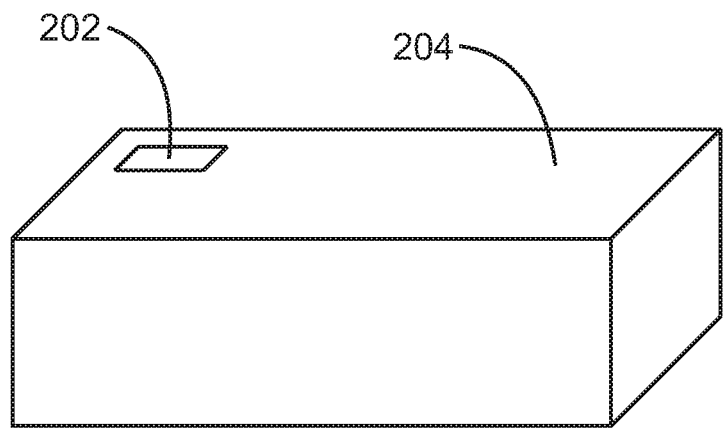
FIG. 2 is a simplified diagram of a part having an identifier (ID), according to examples.

FIG. 2 is a simplified diagram of a part 200 having an identifier (ID) 202, according to examples. In an example, the part 200 is formed using additive manufacturing. Additive manufacturing, as used herein, refers to processes in which materials, such as powders or liquids, are, under computer control, combined (e.g., fused) to form an object. One example of additive manufacturing involves depositing a liquid ink to color the object. Additionally, the ID 202 is added to a surface 204 of the part 200 using additive manufacturing.

The surface 204 of the part 200 is of a first color, while the ID 202 is of a contrasting color. In an example, the ID 202 is not changing the geometry or material properties of the part 200, but only the color, and only a portion of the surface 202.

Figure 3:
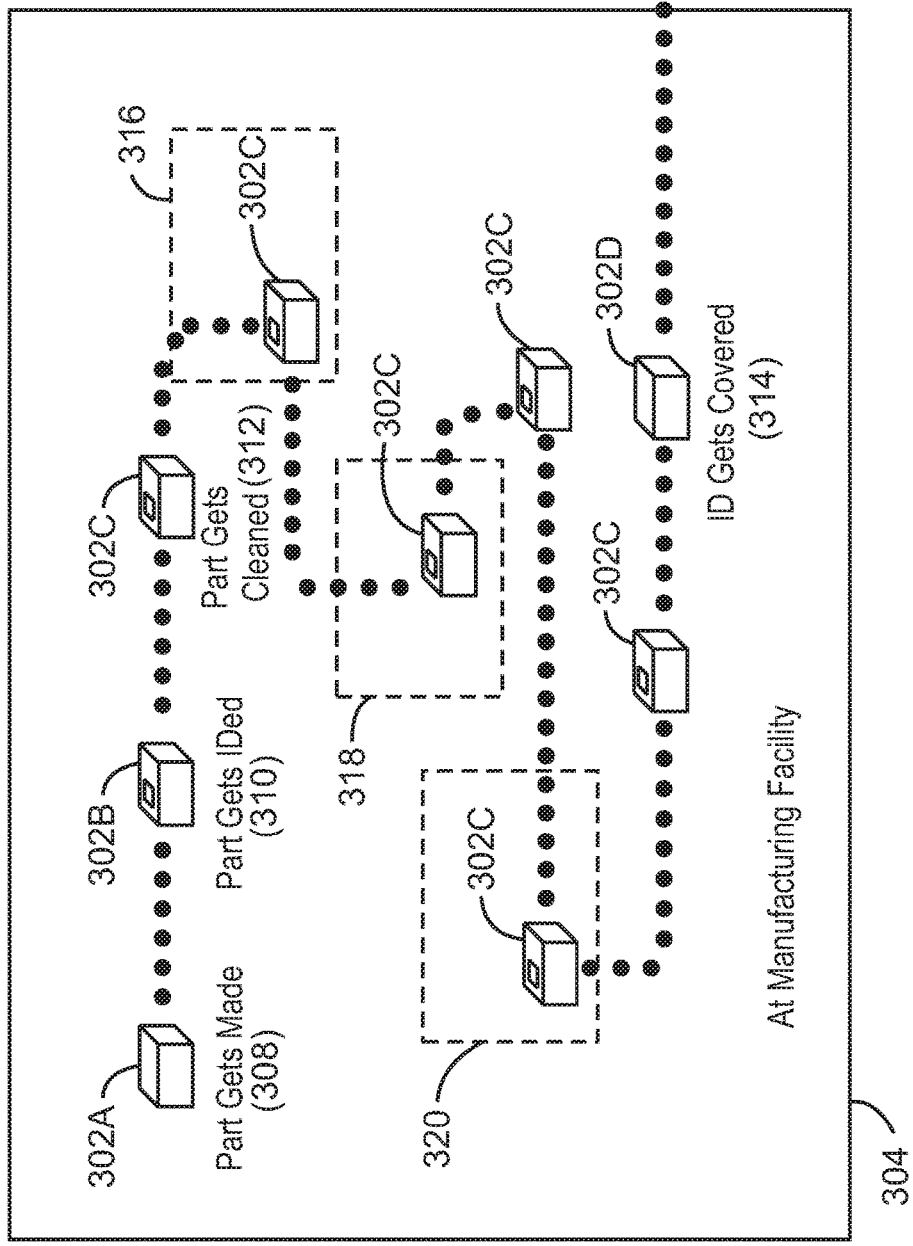
FIG. 3 is a schematic diagram of a manufacturing facility utilizing the method of FIG. 1, according to examples.

FIG. 3 is a schematic diagram of a manufacturing facility utilizing the method of FIG. 1, according to examples. With dots showing its movement, a part 302 is followed through the manufacturing facility 304, in iterations 302A, 302B, 302C, and 302D (collectively, "part 302"). A distinction is made between operations involving the part 302 inside a manufacturing facility 304 (inside the box) and outside the manufacturing facility 306.

At the manufacturing facility 304, the part is made 308, such as by additive manufacture (denoted part 302A). An ID is added to the part 310, also by additive manufacture (denoted part 302B). Before the ID of the part is used in the manufacturing facility, the part is cleaned 312 (denoted part 302C), so as to make its ID visible, whether to a human factory worker or to a digital reading device. After cleaning, the readable ID may be utilized throughout post-production of the part.

In the example of FIG. 3, the manufacturing facility 304 has several divisions, denoted by dashed rectangles, namely, divisions 316, 318, and 320. The divisions may simply denote different geographical areas of the manufacturing facility 304, such as the northern division or division C. Or the divisions may denote different functional operations of the manufacturing facility 304, such as the packaging division, the sorting division, or the quality control division. Managers of manufacturing facilities recognize a number of different ways in which the facility may be organized into different divisions. In FIG. 3, the cleaned part 302C passes through the division 316, then the division 318, then the division 320.

Before leaving the manufacturing facility 304, the ID upon the part 302C gets covered 314, such that the part no longer has an ID that is visible or readable (denoted part 302D). The part 302D is now ready to leave the manufacturing facility. Once outside the manufacturing facility 306, the part 302D no longer has a visible ID. The ID is thus temporary, that is, used within the manufacturing facility and not outside the facility.

As used herein, post-production of the part comprises any operations involving the part that take place at the manufacturing facility after the ID of the part becomes visible (e.g., after being cleaned 312) but before the ID of the part is covered to no longer be visible or readable (e.g., after ID gets covered 314). In FIG. 3, for example, post-production of the part 302 is the time period when the part is labeled 302C. Once the ID gets covered to no longer be visible or readable, the part is no longer in post-production.

After the cleaning process 312, the ID of the part 302C is readable, such as by a human or by a digital reader, such as a barcode reader, and the part is in post-production within the manufacturing facility. The ID of the part is temporarily utilized throughout post-production until the ID gets covered 314 and is no longer visible. The ID may be covered by a final coloring process, such as dyeing, printing, painting, and so on. In examples, the ID is colored in a color that is either the same or similar to the color of the surface of the part upon which the ID was imprinted. Following the coloring, the ID of the part becomes invisible. In an example, the ID may be applied to any surface of the part.

Returning to FIG. 3, the ID printed upon the post-production part 302C may facilitate the movement of the part throughout the manufacturing facility 304. For example, a digital reader of the part 302C may result in the part being loaded onto a conveyor belt toward the division 316, which may be a quality control division, for example. The same reading of the part 302C (or a subsequent reading further downstream by a different digital reader) may then send the part to the division 318, which may be a sorting division. A human in the sorting division (or another digital reader) may then read the part 302C, then walk or otherwise transport the part to the division 320, which may be the packaging division.

Returning to FIG. 2, the ID 202 is printed upon the surface 204 of the part 200. Generally, the ID 202 may be printed upon any surface of the part 200, and may be printed on parts having amorphous surfaces. Thus, the method 100 is not limited to parts with orthogonal surfaces, as the figures indicate simplistic shapes for ease of illustration, not as limitations to the possible size and shape of the part receiving the ID. The ID 202 may be a serial number, an alphanumeric, a graphical alphanumeric, a bar code, a quick response (QR) code, or other printable graphic. The ID 202 may be unique to each part, or may be generic to a group of identical parts. The ID 202 may be used to express an urgency of the part. For example, the ID 202 of the part 200 may be printed with a noticeable color, such as bright red, as long as the printed ID color contrasts with that of the surface 204 of the part. The ID 202 may be a symbol, for example, a star shape, to indicate that the part is to be distinguished from other parts in a group, according to how a reader of the ID reacts. A human line worker, for example, may receive instructions to pull all parts labeled with a star from the assembly line. Thus, the method 100 may allow unique IDs, generic IDs, urgent IDs, and so on, according to the various possible actions and operations that may be performed upon or with the part at the manufacturing facility.

Figure 4:
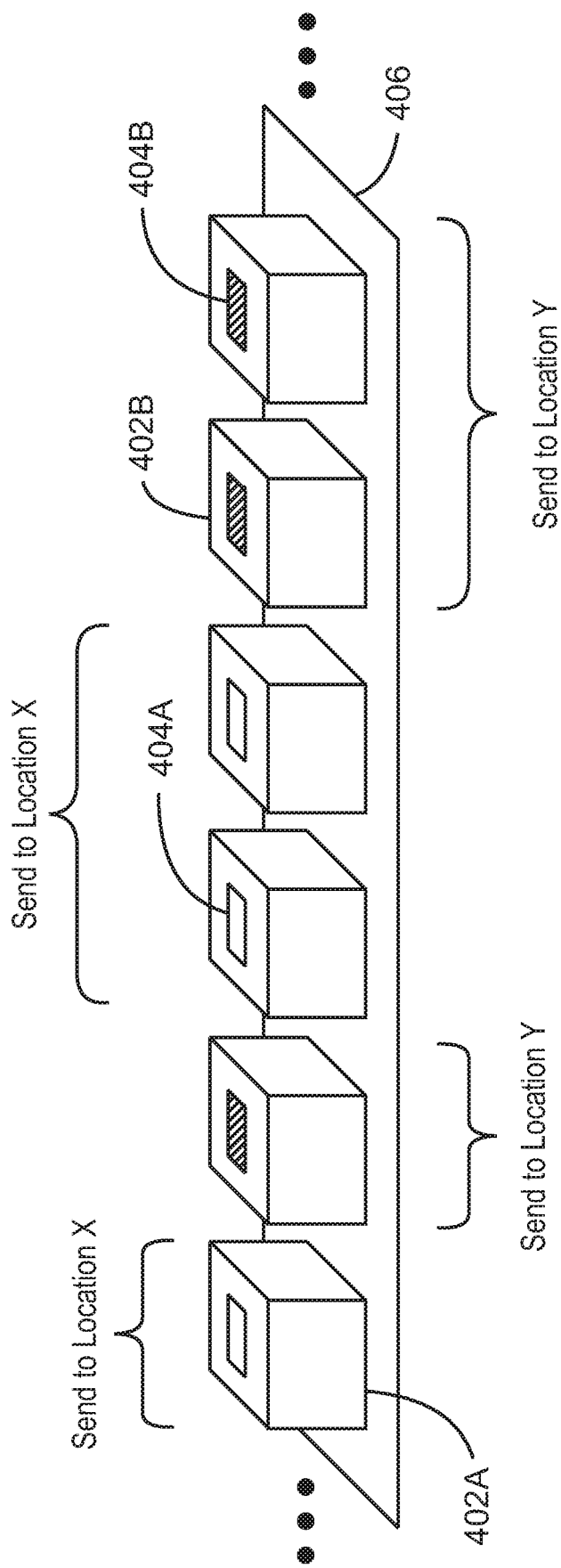
FIG. 4 is a simplified diagram illustrating how parts, once labeled, may be automatically routed a manufacturing facility, according to examples.

FIG. 4 is a simplified diagram illustrating how parts, once labeled, may be automatically routed to selected locations at a manufacturing facility, according to examples. In the example, parts 402A and 402B are moving along a conveyor belt 406. Parts 402A have IDs 404A (plain) while parts 402B have IDs 404B (striped). Upon reaching an ID reader (not shown), which may be a machine or a human, the parts are sent to either location X or location Y. In this example, parts 402A with IDs 404A are sent to location X while parts 402B with IDs 404B are sent to location Y. The temporary IDs thus provide an opportunity for automation during post-production of the part within the manufacturing facility.

Figure 5:
FIG. 5 is an example of a hypothetical toy company in which the method of FIG. 1 is used to sort parts, according to examples.
Figure 5:
Figure 5:
Figure 5:
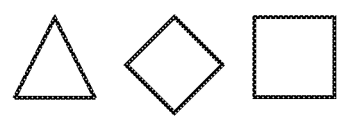

The ID 202 of the part 200 may also be used for sorting based upon manufacturing instructions from a vendor. FIG. 5 is an example of a hypothetical toy company 500, the Acme Toy Company, in which the method of FIG. 1 is used to sort parts, according to examples. Acme Toy Company produces four toys whose parts are manufactured at a facility, such as the facility 304 of FIG. 3. Shapes are used to illustrate distinct parts making up each toy, and may illustrate shape, function, or other characteristics of the part. Toy #1, for example, is made using triangle, circle, and square parts, for example, while toy #2 is made using triangle, circle, square, and diamond parts. All four parts made by Acme Toy Company use the triangle, but only toy #3 uses the pentagon and only toy #2 and toy #4 use the diamond.

Without a temporary ID to sort the various parts making up the four toys of the Acme Toy Company, the manufacturing facility may build a machine that can separately identify triangle parts, circle parts, square parts, and so on. For a reliable customer, the manufacturing facility may deem such an endeavor worthwhile. Nevertheless, the machine would not be useful for other vendors of the manufacturing facility (unless they also build parts using triangles, circles, and squares).

Instead, the method of FIG. 1 may be used to facilitate part sorting at the manufacturing facility on behalf of Acme Toy Company. Temporary IDs, as described above, may be applied to each distinct part, with all triangle parts having a first ID, all circle parts having a second ID, and so on, until all parts manufactured have an ID that coincides with its unique shape, function, or other characteristic. Particularly where an ID reader is able to automatically read the ID of each part, the parts may be automatically sorted into different categories. For example, the parts may be sorted into a bin of triangles, a bin of circles, a bin of squares, and so on. Or, the parts may be sorted into toy #1 bin, toy #2 bin, toy #3 bin, and toy #4 bin. In this way, the ID printed upon the manufactured part is used, at the manufacturing facility, to coordinate the post-processing of possibly hundreds or even thousands of parts, in an efficient manner.

Figure 6A:
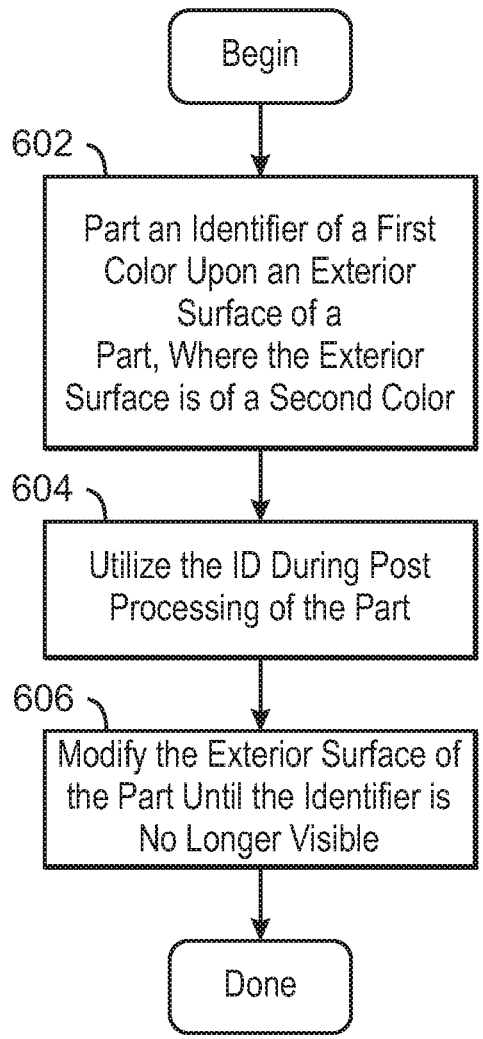
FIGS. 6A and 6B are flow diagrams illustrating operations performed by the method of FIG. 1, according to examples.
Figure 6B:
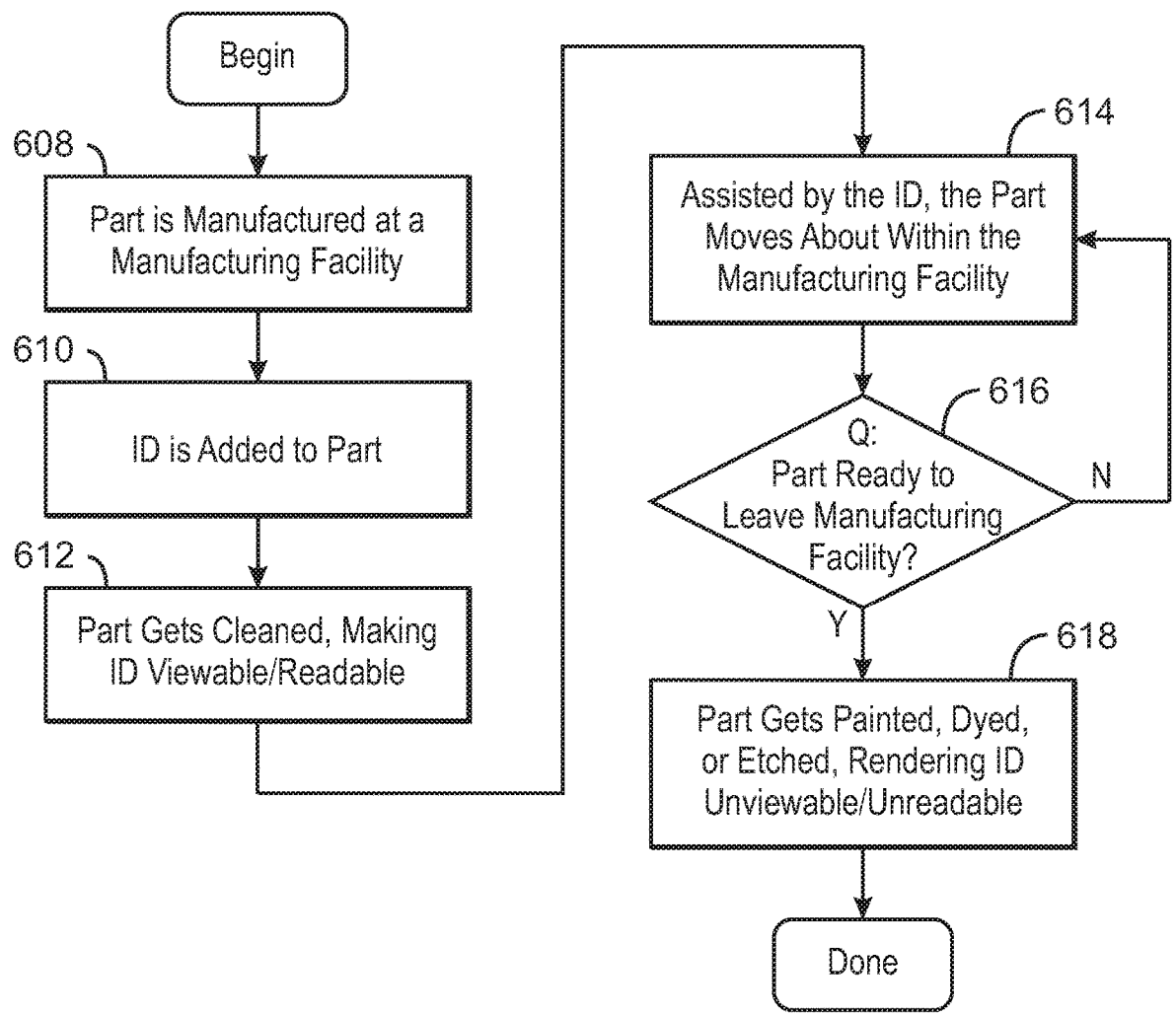

FIGS. 6A and 6B are flow diagrams illustrating operations performed by the method of FIG. 1, according to examples. FIG. 6A illustrates the basic operations to be performed by the method while FIG. 6B illustrates more detailed operations. Starting with FIG. 6A, an ID is printed onto an exterior surface of a part, where the ID is of a first color and the exterior surface of the part is of a second, contrasting color (block 602). The ID is then utilized during post processing of the part, as described above and illustrated (block 604).

The exterior of the surface is then modified so that the ID is no longer visible (block 606).

In FIG. 6B, the part is manufactured at a manufacturing facility (block 608). In an example, the part is a three-dimensional part formed using additive manufacturing techniques. An ID is added to the part (block 610), such as during its additive manufacturing. In an example, the addition of the ID is a last step in the additive manufacturing of the part. In an example, the ID is a temporary identifier, meant to be used at the manufacturing facility, and not outside the manufacturing facility. In an example, the ID is a label containing a color that contrasts with the color of the part, specifically, the color of the surface upon which the ID is printed. In one example, the ID does not change the geometry or material properties of the part, but only the color.

Next, the part is cleaned (block 612) such as by a blower or other device used to remove excess powder from the additive manufactured part. This makes the ID viewable to the naked eye or readable by a digital device. Now that the ID is visible, the part can be moved about the manufacturing facility, in part, aided by the ID (block 614). The ID thus may be indicative of a function of the part (e.g., used in a jet engine), allowing the part to be directed to a location or division related to its intended use (e.g., the assembly of the jet engine). Or, the ID may be indicative of a characteristic of the part (e.g., the part is metal, the part is green, the part is plastic), which again allows the part to be efficiently moved during post-processing to an intended location or division within the manufacturing facility. There are many ways in which the temporary ID may facilitate movement, operation, and treatment of the part during post-production within the manufacturing facility. Thus, the temporary ID may be utilized as embedded information about the part during post-processing.

Until the part is ready to leave the facility (block 616), the ID may be utilized multiple times to both track the part and facilitate its movement through the manufacturing facility (block 614). Finally, however, the ID of the part is covered up (block 618). This may be done by dyeing or painting the surface (or a portion of the surface) of the part upon which the ID is printed. In another example, the color to cover the ID may be printed over the ID. In another example, the ID is selectively removed by scraping or etching of the paint, dye, or other material of the ID disposed upon the surface of the part.

In an example, the part, or at least the surface of the part upon which the ID is printed, is covered by a color that is the same or nearly the same as the surface color. Because the ID is ultimately re-colored (or covered) with a color that matches the color of the part, the ID thereafter becomes invisible. Thus, the ID may be applied to almost any location of the part. Once the temporary ID is no longer viewable by the human eye or readable by a machine, the part is ready to leave the manufacturing facility.

In an example, the method of FIG. 1 may be used on multiple-color parts in which a surface of the multi-color part may be separately dyed or colored. A multi-color part of a first color that has a protruding portion in a second color, for example, may be a candidate for the temporary ID method disclosed herein. The temporary ID may be printed on the protruding portion of the part, in a color that contrasts with the second color. Following use of the temporary ID during post-processing, the protruding portion may be dipped in a dye to color the protruding portion back to the second color.

A part produced during additive manufacture consists of powder material upon which a liquid is selectively deposited. The liquid may be an ink, such as to color the powder, a binder, so as to fuse with the powder, or both. Fusing operations, such as by heating lamps, may also facilitate binding of the powder. Following its additive manufacture, the part, including the temporary ID, may be partially or fully covered with unbound powder.

Figure 7:
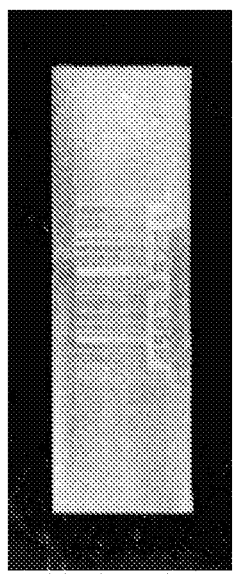
FIG. 7 is an illustration of an ID affixed to an additive manufactured surface, in which the barcode is obscured by powder until cleaned, according to examples.
Figure 7:
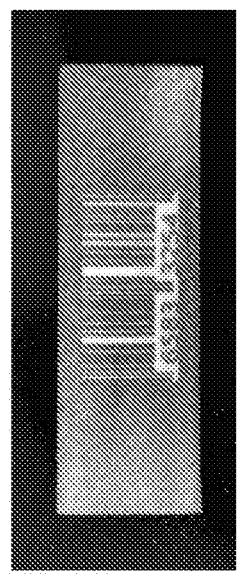
Figure 7:
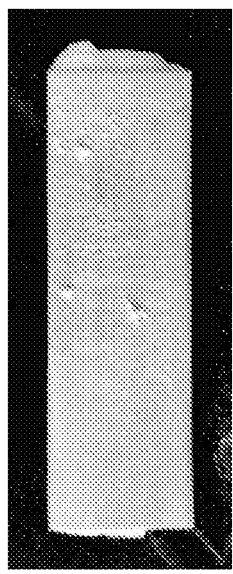
Figure 7:
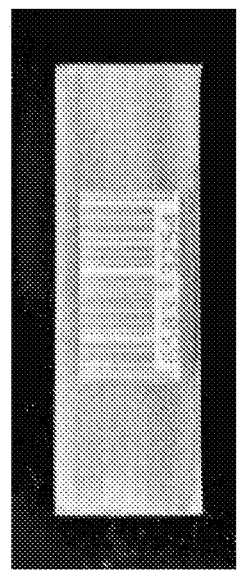

FIG. 7 is an illustration of an ID affixed to an additive manufactured surface, in which the barcode is obscured by powder until cleaned, according to examples. Images A, B, C, and D, depict the surface of a part upon which a temporary ID, in this case, a barcode, has been printed. These images illustrate how the temporary ID may be obscured due to a characteristic of additive manufacturing.

In image A, the surface of the part has not been cleaned at all. Thus, the barcode is not visible. In image B, the surface of the part has been rough cleaned. Because significant amounts of powder remain, the barcode ID is still not visible and would likely not be readable by a digital reader. In image C, the surface of the part has been rough cleaned, but this time, more of the powder has been removed than in image B, and the bar code is partially visible. In image D, the surface of the part has been sandblasted, and the bar code ID is fully visible. In this example, the ID is partially visible, even when the surface has not entirely been cleaned, as in image C.

After the use in post-processing of the ID is complete, the surface of the part can be painted, dyed, or otherwise colored such that the temporary ID is no longer visible. A new ID, such as a serial number, may thereafter be affixed to the part and available outside the manufacturing facility, such as to a wholesaler, retailer, or customer, of the part. The temporary ID described above may bear no relationship to the subsequent ID, which may be more permanent. Further, the subsequent ID may alter the shape or feel of the part, while the temporary ID, which is printed before being covered, does not impact the part shape, feel, geometry, or other characteristics of the part.

The method of FIG. 1 may be used with a variety of additive manufacturing techniques, including, but not limited to, three-dimensional (3D) printing of plastic, metal, or ceramic parts. Further, the techniques of FIG. 1 may be applied to 3D binder jet printing, multi-jet fusion, and other additive manufacturing techniques.

In addition to not affecting the geometry, feel, shape, or other characteristics of the part, the temporary ID disclosed herein is advantageous in other ways. Because the label utilizes already available additive manufacturing technology, the method incurs no additional cost. The temporary ID may assume a wide variety of possible forms, from simple serial numbers and alphanumeric IDs, to ornamental images, to barcodes, QR codes, and other standardized marks, to trademarks associated with goods. The temporary ID may thus assume virtually any form that is printable.

In an example, the temporary ID disclosed herein may be used following post-processing, such as outside the manufacturing facility, as embedded information associated with the part. Printing with a specialized ink that is later detectable by a specialized device, even after the temporary ID has been covered up and is no longer visible, is one possible application in which the value and life of the temporary ID may be extended beyond the manufacturing facility. Thus, for example, the ID may have physical properties that are detectable, such as by magnetic, electromagnetic, or other means, outside the manufacturing facility.

Figure 8:
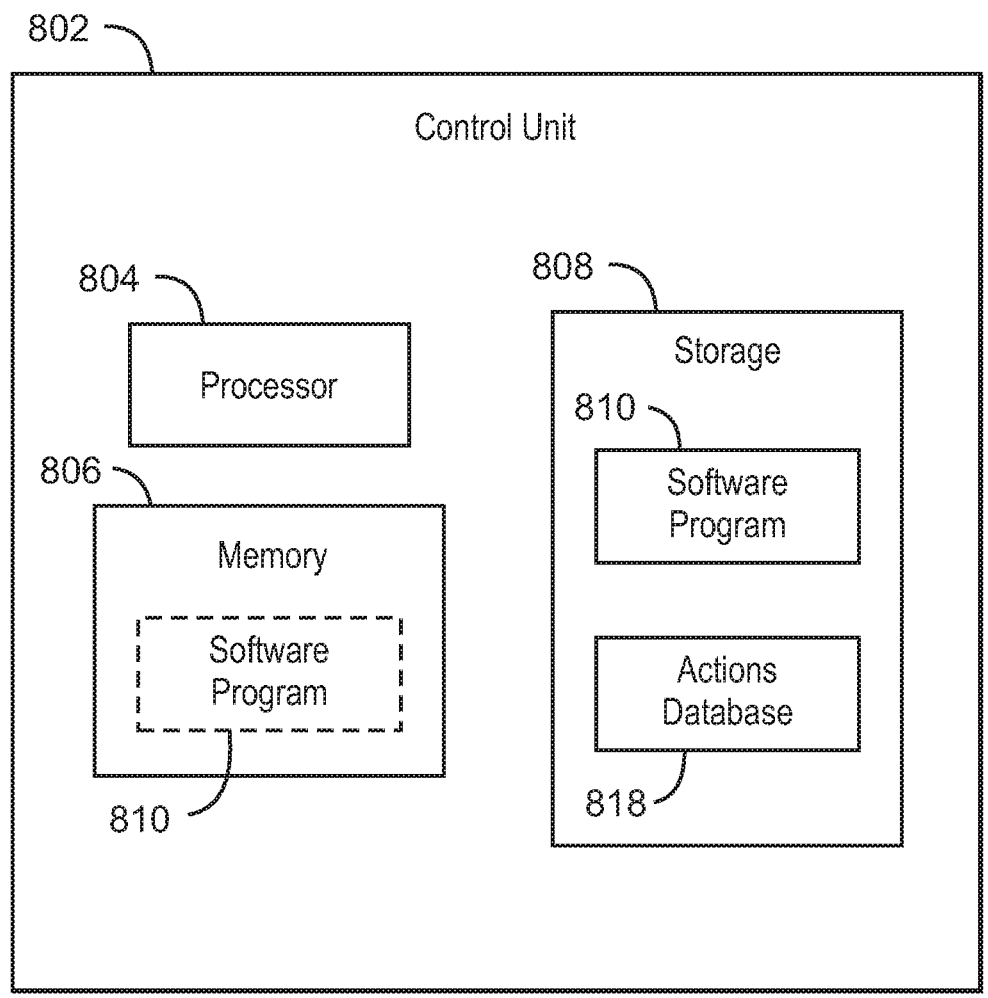
FIG. 8 is a simplified block diagram of a control unit to implement the method of FIG. 1, according to examples.

FIG. 8 is a simplified block diagram of a control unit to implement the method of FIG. 1, according to examples. The control unit 802 includes a processor 804, a memory 806, and storage 808. The processor 804 executes a software program 810 located in the storage 808, once the software program is loaded into the memory 806. In other examples, the control unit 802 may retrieve the software program from a remote location, such as via a wireless network, and load the program into the memory 806. In examples, the software program 810 includes code to implement the method operations of FIG. 1. Namely, the software program 810 includes code to enable an ID of a contrasting color to be printed onto the surface of an additive manufactured part, as described above. The software program 810 may also include code to enable the surface of the part to be cleaned such that the ID is visible or digitally readable. The software program 810 may further include code to enable the ID of the part to be digitally read. And, the software program 810 may include code to enable the surface of the part having the ID to be colored over, such that the ID is no longer visible or readable.

The control unit 802 may further include a database of actions 818 that couple post-processing actions, operations, and movement of the part with the temporary ID. Where the temporary ID is a serial number, the serial number may be an index into the database of actions 818. In an example, the software program 810 is able to find the temporary ID from the actions database and direct the operation, action, or movement of the part based on information provided in the database.

Figure 9:
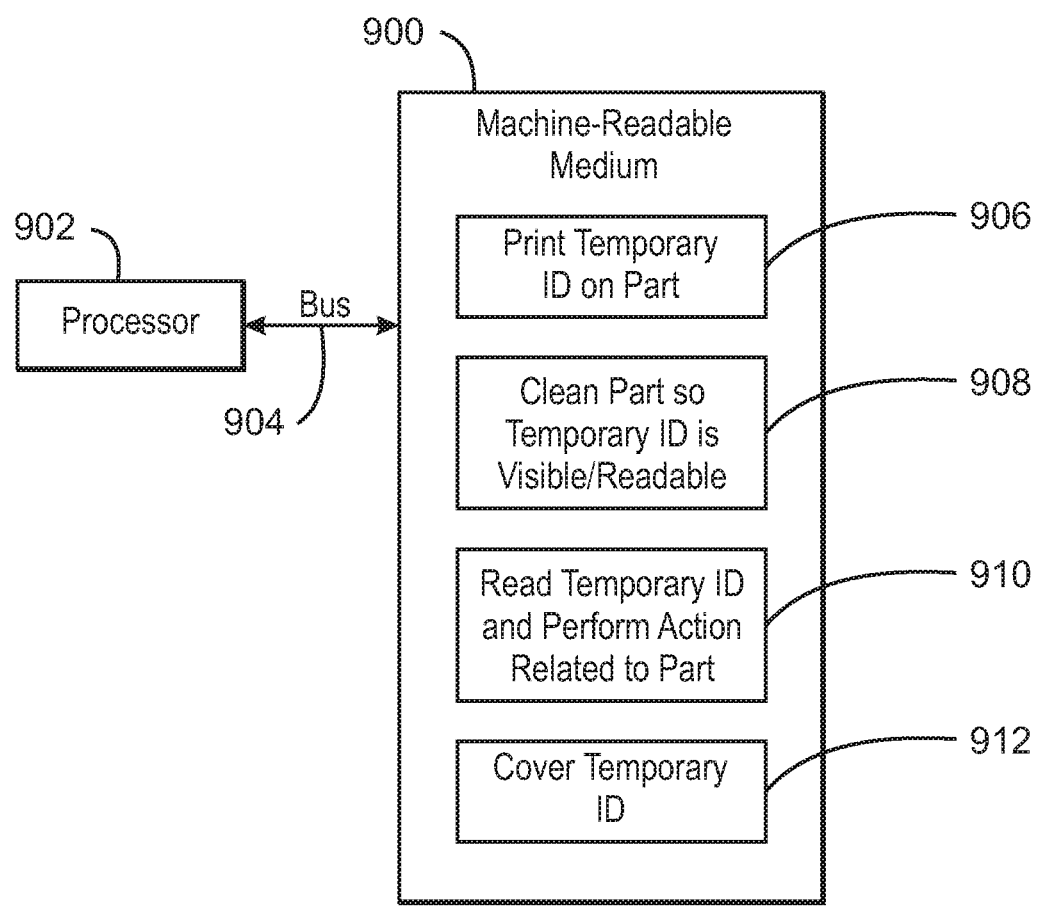
FIG. 9 is a diagram of a computer-readable medium implementing the method of FIG. 1, according to examples.

FIG. 9 is a diagram of an exemplary non-transitory machine-readable medium including code or instructions to direct a processor 802 to implement the temporary ID to be used in a manufacturing facility, according to examples. The processor 802 may access the non-transitory, machine-readable medium 800 over a bus 804. The non-transitory, machine-readable medium 800 may include storage such as the storage 808 of FIG. 8.

The non-transitory machine-readable medium 900 may include code 906, such as the software program 810, to print a temporary ID on an additive manufactured part. The machine-readable medium 900 may also include code 908 to clean the part so that the temporary ID is visible or readable. The machine-readable medium 900 may also include code 910 to read the temporary ID and perform an action in accordance with instructions, actions, operations, or movements of the part. And, the machine-readable medium 900 may include code 912 to cover the temporary ID by painting, dyeing, printing over a surface of the part such that the temporary ID is no longer visible or readable.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A method comprising:
   printing an identifier of a first color upon an exterior surface of a part using additive manufacturing, the exterior surface comprising a second color;
   modifying the exterior surface until the identifier is not visible or digitally readable, wherein the identifier is utilized during post-processing of the part; and
   cleaning the part such that excess powder is removed from the part, wherein the identifier is visible following the cleaning.

2. The method of claim 1, wherein the identifier is selected from a group consisting comprises meta-data, a bar code, a quick response code, a serial number, a lot number, a job identification number, a geometric mark, and a vendor number.

3. The method of claim 1, wherein the modifying comprises dyeing or painting the exterior surface comprising the identifier.

4. The method of claim 1, wherein the modifying comprises removal by etching or scratching the exterior surface comprising the identifier.

5. A method comprising:
   printing an identifier of a first color upon an exterior surface of a part using additive manufacturing, the exterior surface comprising a second color; and
   modifying the exterior surface until the identifier is not visible or digitally readable; wherein the identifier is utilized during post-processing of the part, wherein the modifying comprises second printing of the exterior surface.

6. A method comprising:
   applying an identifier to a surface of a part using additive manufacturing, wherein the identifier is visible or digitally readable once applied; and
   using the identifier during post-processing of the part, wherein the identifier is removed before leaving a facility in which the part is to be made, and wherein the part is one of a group of parts and the identifier is unique to the group.

7. The method of claim 6, further comprising: removing the identifier by etching or scratching the surface until the identifier is not visible.

8. A method comprising:
   applying an identifier to a surface of a part using additive manufacturing, wherein the identifier is visible or digitally readable once applied;
   using the identifier during post-processing of the part, wherein the identifier is removed before leaving a facility in which the part is to be made, and
   removing the identifier by dyeing or painting the surface of the part until the identifier is not visible.

9. The method of claim 8, wherein the identifier is selected from the group consisting of meta-data, a bar code, a quick response code, a serial number, a lot number, a job identification number, a geometric mark, and a vendor number.

10. A machine-readable medium having instructions stored therein that, in response to being executed on a computing device, cause the computing device to:
    print an identifier upon a surface of a part using additive manufacturing; clean the part until the identifier is visible or digitally readable; and
    modify the surface until the identifier is not visible or digitally readable following post-processing of the part, wherein the modifying comprises coloring the surface by dyeing.

11. The machine-readable medium of claim 10, wherein the identifier is to be printed in a first color and the surface is printed in a second color and the first color contrasts with the second color.

12. A machine-readable medium having instructions stored therein that, in response to being executed on a computing device, cause the computing device to:
    print an identifier upon a surface of a part using additive manufacturing; clean the part until the identifier is visible or digitally readable; and modify the surface until the identifier is not visible or digitally readable following post-processing of the part, wherein the part is to be one of several parts comprising an object and the identifier references the object.

* * * * *